No. 670,663. Patented Mar. 26, 1901.
T. D. BUNCE.
COMBINED HYDROMETER AND SYRINGE.
(Application filed June 7, 1900.)
(No Model.)
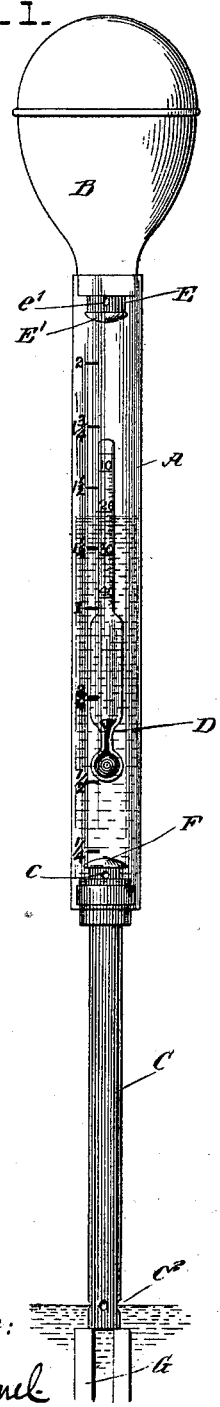
WITNESSES:
James T. Duhamel
J. L. McAuliff
INVENTOR
Theodore D. Bunce.
BY
ATTORNEYS

UNITED STATES PATENT OFFICE.

THEODORE DWIGHT BUNCE, OF NEW YORK, N. Y.

COMBINED HYDROMETER AND SYRINGE.

SPECIFICATION forming part of Letters Patent No. 670,663, dated March 26, 1901.

Application filed June 7, 1900. Serial No. 19,396. (No model.)

*To all whom it may concern:*

Be it known that I, THEODORE DWIGHT BUNCE, a citizen of the United States, and a resident of the city of New York, borough of Manhattan, in the county and State of New York, have invented new and useful Improvements in a Combined Hydrometer and Syringe, of which the following is a full, clear, and exact description.

The object of the invention is to provide an instrument for testing the specific gravity of a liquid without decanting the latter, the instrument having special usefulness in connection with the care of secondary batteries, and particularly the batteries of electrically-propelled automobiles. The instrument, which comprises a hydrometer the container of which is formed by the barrel of the syringe, is designed to test the specific gravity of the electrolyte of the batteries and is arranged so that in supplying the batteries with the electrolyte, using my improved instrument as a syringe, the surplus fluid may be withdrawn from the battery, the syringe-nozzle for this purpose being orificed a distance from the tip, so that when the nozzle is placed upright, with the tip or end on top of the battery-plates, the syringe will withdraw so much of the electrolyte as may be above the orifices, leaving the electrolyte above the plates to a height equal to the distance between the tip and the orifices.

The invention will be hereinafter particularly described, and defined in the claims.

Reference is to be had to the accompanying drawings, forming a part of this specification, in which similar characters of reference indicate corresponding parts in both the figures.

Figure 1 represents my improved instrument in elevation, and Fig. 2 is a longitudinal section.

The syringe comprises the barrel A, the bulb B, and the nozzle C. The barrel A is made wholly or partly of glass or other transparent material, and within the barrel is a hydrometer D—that is, any instrument indicating variations of strength of fluids, an ordinary Baumé hydrometer being shown. Thus the barrel of the syringe forms the container for the hydrometer, and the latter will at once indicate the specific gravity of a liquid drawn into the syringe by the bulb B. To cushion the hydrometer D at the upper or rear end of the barrel, I provide the bulb B with a plug E, having a cap E′, of soft rubber or other suitable material, the plug having an axial passage $e$ and lateral openings $e'$ leading therefrom to the exterior of the plug for the passage of the air. A similar cushion F is provided on the inner end of the nozzle C, and the latter has lateral passages $c$ beneath the cushion F, which lead to the axial bore $c'$ of the nozzle. The cushions E′ and F as thus arranged prevent breaking of the hydrometer, and with the passages $e'$ and $c$ the hydrometer will not interfere with the working of the syringe.

For testing the strength of the electrolyte in storage batteries such as used in automobiles, where there are many cells and where there is no facility for placing the hydrometer in the electrolyte, my improved instrument is particularly useful, but is also useful for testing bottled or barreled liquids.

If it is desired that the syringe be used as a measurer, the barrel A may be suitably graduated, as shown in Fig. 1, in which the graduations for a two-ounce barrel are given.

For the purpose of supplying fluid to a set of storage-cells, where it is necessary to have an equal quantity above the top of the plates in the respective cells, I provide the nozzle C with orifices $c^2$ at a proper distance from the end or tip, so that by adding sufficient of the fluid and to a slight excess the surplus may be withdrawn to a level with the orifices $c^2$, leaving the predetermined quantity above the plates, (indicated in part at G, Fig. 1.)

Having thus described my invention, I claim as new and desire to secure by Letters Patent—

1. The herein-described instrument, comprising a syringe having a transparent barrel, cushions at the ends of the barrel, and a hydrometer movable in said barrel, the syringe having passages for air and liquid at the back of the cushions, and leading to the bulb and nozzle of the syringe, said passages comprising a longitudinal passage and transverse openings leading to said passages.

2. The herein-described instrument, comprising a syringe having a transparent barrel, a bulb, a plug at the connection of the bulb and barrel, said plug having an axial bore and lateral openings leading from the said bore to the exterior, a cushion consisting of a cap of soft rubber fitted to the plug at the forward end of said plug, a nozzle having a through-bore and lateral openings adjacent to each end of the nozzle and a soft-rubber cap on the inner end of the nozzle.

In testimony whereof I have signed my name to this specification in the presence of two subscribing witnesses.

THEODORE DWIGHT BUNCE.

Witnesses:
LOUIS W. STOTESBURY,
OLIVER R. BRANCH.